Nov. 21, 1933.  L. A. PARADISE ET AL  1,935,987
DRAFT CONNECTION
Filed Nov. 19, 1928
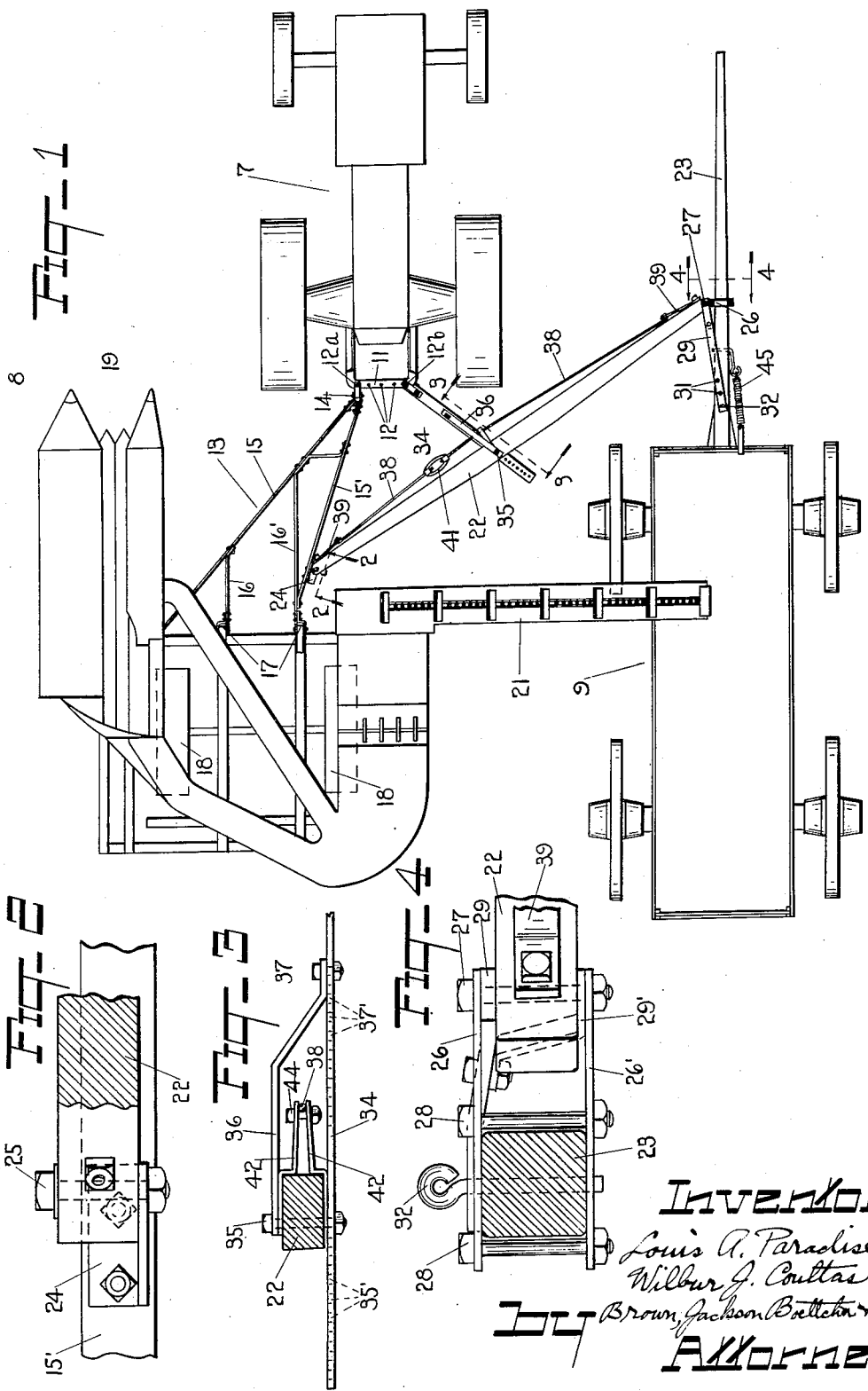
Inventors
Louis A. Paradise
Wilbur J. Coultas
By Brown, Jackson, Boettcher & Dienner
Attorneys Patented Nov. 21, 1933

1,935,987

UNITED STATES PATENT OFFICE 1,935,987

DRAFT CONNECTION

Louis A. Paradise and Wilbur J. Coultas, Moline, Ill., assignors to Deere & Company, Moline, Ill., a corporation of Illinois Application November 19, 1928
Serial No. 320,322

8 Claims. (Cl. 280—33.44)

The present invention relates to draft connections, and has particular reference to improved means for transmitting draft from the rear end of a tractor or like pulling vehicle to an agricultural implement and also to a wagon disposed alongside of said implement. The utility of such type of draft connection is well illustrated in instances where it is desired to have the tractor serve the two-fold function of pulling a corn picker and also a wagon disposed alongside the corn picker in position to receive the ears of corn therefrom. The corn picker usually has an elevator conveyor which discharges the ears of corn into the wagon, and the draft connection, in addition to pulling the wagon, must effect steering guidance thereof so as to maintain the wagon under the end of the elevator conveyor in position to receive the ears of corn discharged therefrom.

The principal object of the invention is to provide an improved draft connection of this type which will effect better steering guidance of the wagon than has heretofore been possible, particularly in making the turns at the ends of the field. It is essential that the wagon be retained directly under the discharge end of the elevator conveyor for receiving all of the ears of corn, and this is true even after the picker has passed beyond the end of the corn row and is making a turn because the ears are still being discharged from the conveyor at this time owing to the delay in the passage of the previously picked ears through the husking mechanism and up the conveyor. In prior draft connections of this type, with which we are familiar, it has been difficult to maintain accurate steering guidance of the wagon, particularly in turning, resulting in objectionable side draft and an unwieldy action of the wagon, and also frequently resulting in the wagon swinging laterally away from under the end of the elevator conveyor and allowing the ears of corn to drop upon the ground. Such is avoided by certain improvements in the present draft connection, particularly the establishing of two laterally spaced hitch points between the draft mechanism and the draw bar of the tractor, whereby the swinging movement of the tractor acts with a pronounced steering movement on the tongue of the wagon, as will be hereinafter described in detail.

A further object of the invention is to embody improved adjusting means in the draft connection for adjusting the lateral or transverse spacing between the implement and the wagon, as for the purpose of properly positioning the wagon under the discharge end of the elevator conveyor under different conditions.

Still another object of the invention is to provide improved adjusting means in the draft connection for adjusting the wagon forwardly or rearwardly relatively to the corn picker, as for the purpose of enabling the load to be evenly distributed in the wagon.

Other objects and advantages of the invention will appear in the following description of a preferred embodiment thereof.

In the accompanying drawing illustrating such embodiment:

Fig. 1 is a plan view showing the application of the present draft connection to the tractor, the corn picker, and the receiving wagon.

Figs. 2, 3 and 4 are detail sectional views taken approximately on the planes of the lines 2—2, 3—3 and 4—4 of Fig. 1.

The tractor, or like pulling vehicle, is diagrammatically indicated at 7, the corn picker at 8, and the receiving wagon at 9. Secured to the rear of the tractor is a transversely extending draw bar 11 having a plurality of spaced holes 12 therein for establishing hitch points at laterally spaced locations across said drawbar. Draft is transmitted to the corn picker 8 through a draft member 13 acting directly in tension to transmit the pull of the tractor to the corn picker. The front end of this draft member is pivotally connected with the tractor draw bar 11 by a vertical pivot pin or bolt which is placed in one of the holes 12 to dispose this hitch point 12a adjacent to the side of the draw bar.

The clevis through which this hitch is established is pivotally connected with the draft member 13 through a horizontal pivot bolt 14 which permits vertical angular movement between the vehicles as they pass over uneven ground. The draft member is constructed in the form of an open frame comprising two diagonally extending bars 15, 15' which are reinforced by longitudinally extending bars 16, 16'. The rear portion of said draft frame is rigidly secured to the front portion of the corn picker frame at a plurality of laterally spaced points, as indicated at 17. The picker is supported on two side wheels 18, 18, being held against tipping forwardly or rearwardly through the draft member 13. Said draft member extends diagonally rearwardly and outwardly from the hitch point 12a to dispose the picker outwardly to the side of the line of travel of the tractor 7, in proper position for having the picking or snapping rolls 19 engage the stalks of the corn row. The picked ears after being conveyed through husking mechanism on the picker are delivered to an upwardly extending elevator conveyor 21 which projects laterally from the picker for discharging the husked ears into the wagon 9 disposed alongside the picker on the opposite side of the tractor.

Draft and steering guidance is transmitted to the receiving wagon 9 through a diagonal beam 22 which extends forwardly and laterally from the draft member 13 to the tongue 23 of the wagon. The inner end of the diagonal beam 22 has pivotal connection with the rear portion of the draft member 13, such pivotal connection being effected by bolting an angle bar bracket 24 to the side of the inner draft frame bar 15', and supporting the diagonal beam on the horizontally extending flange of said bracket with a pivot bolt 25 extending down through said beam and through the horizontal flange of the bracket.

The outer end of the diagonal beam extends between two plates or bars 26 and 26' which extend transversely across the upper and lower sides of the wagon tongue 23. The beam is pivotally connected between these plates on a pivot bolt 27 extending through the plates and through the beam. Vertical bolts 28 extend between the two plates 26, 26' on each side of the wagon tongue, so that the two plates form in effect a slidable yoke or connecting frame capable of being shifted endwise along the tongue. Draft is transmitted from the diagonal beam to the wagon through a strap or bar 29 which has its front end apertured for receiving the pivot bolt 27, this end of the bar preferably engaging the bolt between the top of the beam and the upper plate 26, as shown in Fig. 4. If desired, a hammer strap 29' may engage with the pivot bolt 27 below the diagonal beam and be secured to the draft bar 29 at a point spaced rearwardly from the diagonal beam. The rear portion of the bar 29 is provided with a plurality of spaced holes 31 therein to receive a draft pin 32 which passes down through the wagon tongue, which draft pin may be the ordinary coupling pin on which the evener bar of the doubletree is usually pivoted. It will be evident that by having such pin engage selectively in different holes 31 in the bar 29 a relative fore and aft adjustment can be effected between the front end of the diagonal beam 22 and the wagon.

Pivotally connected to an intermediate point of the diagonal beam 22 is a pull bar 34 which extends diagonally forwardly and is pivotally connected directly to the tractor. The point of pivotal attachment between said bar and the draw bar of the tractor is at one of the holes 12 adjacent to the side of the draw bar so that this hitch point, designated 12b, is spaced laterally an appreciable distance from the hitch point 12a through which the picker implement is drawn.

Referring to Fig. 3, the pull bar 34 extends transversely under the diagonal beam 22 and has pivotal connection with a pivot bolt 35 extending through the beam. A hammer strap or bar 36 is secured to the pull bar 34 by a bolt 37 and engages at its rear end with the pivot bolt 35 above the diagonal beam 22 for transmitting an even pull to the beam. The pivot bolt 35 is adapted to engage selectively in any one of a series of holes 35' formed in the outer portion of the pull bar, and likewise, the bolt 37 is adapted to engage in any selected one of a series of holes 37' formed in the intermediate portion of the pull bar. By shifting these two bolts and the hammer trap 36 inwardly or outwardly along the length of the pull bar the diagonal beam 22 can be shifted relatively thereto for swinging its outer end inwardly or outwardly with respect to the tractor.

To reinforce the diagonal beam against the forwardly acting bending stresses set up therein in transmitting draft to the wagon, two tie rods 38, 38 have their outer ends fastened to clips 39 bolted to the ends of the beam and have their inner ends connected to a turn buckle 41. The intermediate portion of this tie connection is spaced from the front edge of the beam by two angularly bent clips 42 (Fig. 3) which are secured to the beam by the pivot bolt 35 and which have their forwardly extending ends gripped to the tie rod by a bolt 44. Tension established in these tie rods through the turn buckle 41 reinforces the diagonal beam 22 against forward bending stresses.

The wagon tongue 23 may be supported in substantially horizontal position by any suitable spring or link connection 45 extending between the tongue and the upper part of the wagon box.

It will be seen from the foregoing that the draft mechanism embodies adjustments by which the lateral spacing between the corn picker and the wagon can be readily adjusted, and by which the wagon may be readily adjusted fore and aft relatively to the corn picker. By shifting the draft bar 29 to have the pin 32 engage in different ones of the holes 31 the wagon can be shifted fore and aft relatively to the outer end of the diagonal beam 22. By shifting the two bolts 35 and 37, together with the hammer trap 36, relatively to the pull bar 34 the angle of the diagonal beam 22 can be adjusted to swing the outer end thereof inwardly and outwardly or forwardly and rearwardly. Different combinations of these two adjustments may be utilized for positioning the wagon in any desired relation to the corn picker and to the tractor.

The more accurate steering guidance of the wagon is brought about by pivotally connecting the pull bar 34 directly to the tractor at a hitch point spaced laterally from the hitch point 12a. Assuming that the tractor is turned to the left, it will be seen that at the very start of the turning movement the hitch point 12b will be advanced ahead of the hitch point 12a with respect to the previous line of travel, with the result that the diagonal beam 22 will be swung forwardly and inwardly for immediately deflecting the line of travel of the wagon.

Conversely, when the tractor is being turned to the right the hitch point 12b will be moved rearwardly with respect to the hitch point 21a at the start of the turn, with the result that the diagonal beam 22 will be swung rearwardly and outwardly for immediately deflecting the course of travel of the wagon. Hence the guidance of the wagon follows directly the steering movement of the tractor, there being no delay incident to the corn picker first starting to turn and the wagon thereafter following the turning movement of the picker. The provision of the spaced hitch points results in the draw bar 11 of the tractor acting with a direct steering leverage on the diagonal beam 22 instead of the steering leverage being transmitted thereto through the draft member 13 from the steering force effective on the corn picker. In consequence, the present draft connection assures that the wagon will remain under the discharge end of the elevator conveyor 21 throughout the entire turn, and also assures more accurate steering guidance of the wagon and with less side draft when turning or when traveling straight ahead. The lateral spacing between the two hitch points 12a and 12b may be adjusted to meet different conditions, so long as sufficient spacing is maintained between these two points to retain accurate steering control over the wagon.

While we have specifically described our invention in association with a corn picker and a wagon for receiving the ears of corn, it will be understood that the invention is not limited to this specific use, but may be employed with other agricultural implements in situations where wagons or other secondary vehicles are drawn alongside the implement.

Having thus described our invention, what we claim as new and desire to secure by Letters Patent is:

1. Draft mechanism for transmitting draft from a tractor to an agricultural implement and to a wagon disposed at the side of said implement, comprising a draft member connected with the implement and pivotally connected to the tractor at one hitch point, a diagonal beam extending between said draft member and the tongue of the wagon, a pull member extending from said beam and pivotally connected directly to the tractor at a second hitch point spaced laterally from said first hitch point, a pair of plates mounted on the upper and lower sides of the wagon tongue and projecting laterally therefrom, means pivotally connecting the outer end of said diagonal beam between the laterally projecting portions of said plates, said plates being shiftable endwise along the tongue, a draft pin carried by said tongue, and a draft bar connected with said diagonal beam and having a plurality of holes therein adapted selectively to receive said draft pin for permitting fore and aft adjustment of the wagon relatively to the outer end of said diagonal beam.

2. Draft mechanism for transmitting draft from a tractor to an agricultural implement and to a wagon disposed at the side of said implement, comprising a draft member connected with the implement and pivotally connected to the tractor at one hitch point, a diagonal beam pivotally connected at its inner end to said draft member, means connecting the outer end of said beam with the wagon, a pull bar pivotally connected directly to the tractor at a second hitch point spaced laterally from said first hitch point, a pivot bolt connecting said diagonal beam and said pull bar, a hammer strap engaging with said pivot bolt on one side of said diagonal beam, and an attaching bolt for securing said hammer strap to said pull bar, said pull bar having a plurality of spaced holes therein for adjustably receiving said pivot bolt and said attaching bolt at different points along the length of said bar for adjusting the diagonal beam relatively to the tractor.

3. Draft mechanism for transmitting draft from a tractor to an agricultural implement and to a wagon disposed at the side of said implement, comprising a draft member connected with the implement and pivotally connected to the tractor at one hitch point, a diagonal beam extending between said draft member and the wagon and operatively connected with the tongue of the wagon, a pull member pivotally connected directly to the tractor at a second hitch point spaced laterally from said first hitch point, a pivot bolt connecting said pull member with said diagonal beam intermediate the ends of the latter, bracket means secured to said diagonal beam by said pivot bolt, and a tie rod extending in tension between the end portions of said diagonal beam and spaced from the forward edge of the beam intermediate its ends by said bracket means.

4. A draft connection between an agricultural implement pivoted to a tractor at one hitch point and a wagon disposed at the side of said implement, comprising a diagonal beam pivotally connected with the implement, a pull bar pivotally connected with the beam at its rear end and pivotally connected at its forward end directly to the tractor at a second hitch point spaced laterally from said first hitch point, means pivotally connected to the outer end of said diagonal beam for receiving the wagon tongue, said means being shiftable endwise along the tongue, a draft pin carried by the tongue, and a draft bar connected with the diagonal beam and having a plurality of holes therein adapted selectively to receive said draft pin for permitting fore and aft adjustment of the wagon relative to the outer end of said diagonal beam.

5. Draft mechanism for transmitting draft from a tractor to an agricultural implement and to a wagon disposed at the side of said implement, comprising a draft member connected with the implement and pivotally connected to the tractor at one hitch point, a diagonal beam pivotally connected with said implement, means connecting the outer end of said beam with the wagon, a pull bar pivotally connected directly to the tractor at a second hitch point spaced laterally from said first hitch point, a pivot bolt connecting said diagonal beam and said pull bar, a hammer strap engaging with said pivot bolt on one side of said diagonal beam, and an attaching bolt for securing said hammer strap to said pull bar, said pull bar having a plurality of spaced holes therein for adjustably receiving said pivot bolt and said attaching bolt at different points along the length of said bar for adjusting the diagonal beam relatively to the tractor.

6. Draft mechanism for transmitting draft from a tractor to an agricultural implement and to a wagon disposed at the side of said implement, comprising a draft member connected with the implement and pivotally connected to the tractor at one hitch point, a diagonal beam extending between the implement and the wagon and operatively connected with the tongue of the wagon, a pull member pivotally connected directly to the tractor at a second hitch point spaced laterally from said first hitch point, a pivot bolt connecting said pull member with said diagonal beam intermediate the ends of the latter, bracket means secured to said diagonal beam by said pivot bolt, and a tie rod extending in tension between the end portions of said diagonal beam and spaced from the forward edge of the beam intermediate its ends by said bracket means.

7. A draft connection between an agricultural implement pivotally connected to a fixed point on the tractor and a wagon disposed at the side of the implement, comprising a diagonal beam pivotally connected at its rear end with the implement, a connection between the forward end of the beam and the tongue of the wagon for pulling the wagon and steering the same, said connection also being adapted to prevent the wagon from advancing relative to the diagonal beam, and a rigid draft member connected at its rear end to the diagonal beam at a point intermediate the ends of the latter and being connected at its forward end to a fixed point on the tractor spaced from the point of pivotal connection of the implement with the tractor.

8. A draft connection between an agricultural implement pivotally connected to a fixed point on the tractor and a wagon disposed at the side of the implement, comprising a diagonal beam pivotally connected at its rear end with the implement, a connection between the forward end of the beam and the tongue of the wagon for pulling the wagon and steering the same, said connection comprising a rigid member arranged to transmit stresses from the wagon fore and aft to the forward end of the beam from either direction whereby the wagon is prevented from advancing relative to the diagonal beam, and a rigid draft member connected at its rear end to the diagonal beam at a point intermediate the ends of the latter and being connected at its forward end to a fixed point on the tractor spaced from the point of pivotal connection of the implement with the tractor.

LOUIS A. PARADISE.
WILBUR J. COULTAS.